Patented June 3, 1930

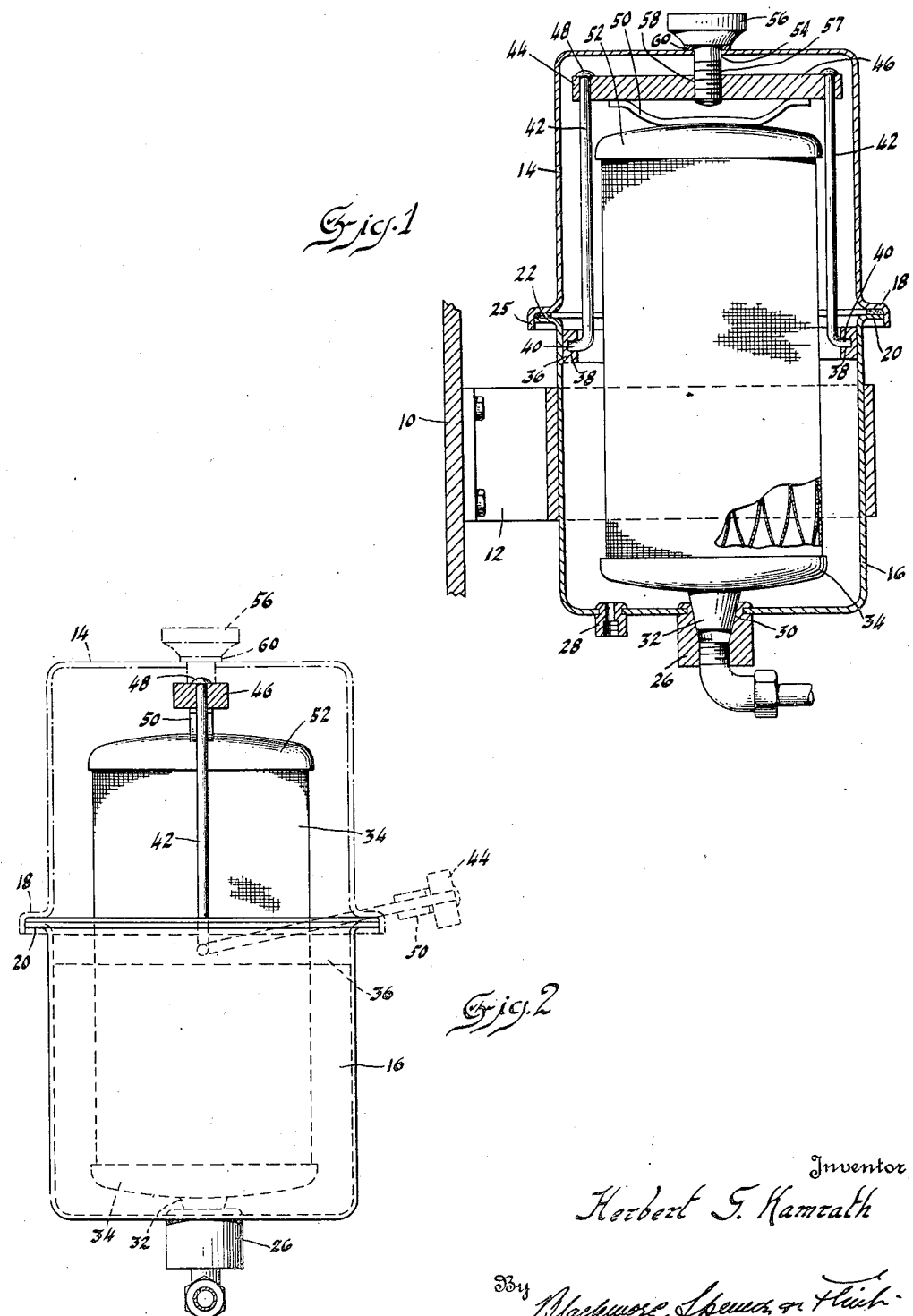

1,761,924

UNITED STATES PATENT OFFICE

HERBERT G. KAMRATH, OF FLINT, MICHIGAN, ASSIGNOR TO A C SPARK PLUG COMPANY, OF FLINT, MICHIGAN, A COMPANY OF MICHIGAN

OIL FILTER

Application filed November 2, 1927. Serial No. 230,563.

This invention relates to oil filters and particularly to the container therefor.

Oil filters in use at the present time on machines or on automotive vehicles consist of a container inclosing the filtering medium unit, and when the filter becomes clogged or refuses to function it is necessary to throw it away as an entirety and replace it with a new filter for the reason that the filtering medium cannot be removed without destroying the container. The object of the present invention is to construct a container built up of sections, one of which may be removed in order that the filtering unit inclosed therein may be removed, and a new filtering unit installed. This will enable the old filter container to be reused at a considerable saving in expense, and will facilitate installation due to the fact that it will be unnecessary to break the pipe connections to the filter can or remove the can from its fastenings to the vehicle, or machine with which it is used.

My container comprises two complementary and substantially similar end sections which are removably secured to each other. One of the sections has an inlet portion which has a seat, preferably tapered, for the reception of the filtering medium unit. This portion also has a band or strip secured thereto in which there is pivotally mounted a bail member, to the base of which there is attached a suitable spring. The end of the other section has an opening through which there is passed a screw which turns into the base member to rigidly hold the sections and the inclosed filter medium unit in secured position. The bail member in operative position swings over the filter unit and retains it pressed against the inlet due to the pressure of the spring fastened on the base of the bail. The bail may be swung away from the filtering unit to allow for its removal and replacement.

Referring to the drawing:

Figure 1 shows a section through my improved container showing the filter unit in position therein.

Figure 2 is a view at right angles to Figure 1 with the upper portion of the container removed but its position indicated in dotted outline.

Referring to the numbered parts on the drawing, the numeral 10 represents the dash of an automobile, or a suitable part of a machine, to which there is secured the clamping member 12 which embraces the filter container to hold it in position.

The novel container of the invention comprises two complementary substantially similar upper and lower portions 14 and 16 having flanges 18 and 20 at their immediate edges and between which there is confined a gasket 22 to make a liquid tight connection. One of the flanges is provided with a second flange 25 to overlap the flange on the opposite section. In practice this flange is preferably placed on the removable section.

One of the sections, preferably the stationary section, is provided with an inlet 26 and an outlet 28. The inlet 26 is provided with a seat 30, which is preferably tapered as shown in Figure 1, for the reception of the tapered end portion 32 of the filtering unit 34.

The stationary section is provided with a band or strip 36 secured thereto and preferably on its inner side. This strip is provided with diametrically opposed openings 38 for the reception of hooked ends 40 of the wires 42 forming the lateral arms of a holding means in the form of a bail 44, the base 46 of which is secured to the wire arms by means of the riveted over ends 48.

At the underside of the base 46 there is secured the leaf spring 50—but which may be a coil spring—which when the bail 44 is in its operative position, presses against the upper portion 52 of the filter or purifying unit 34 to thereby securely hold it in position. The spring 50 may be secured at either or both of its ends to the base 46.

The removable portion 14 is provided with an opening 54 at its end and through this opening there passes a headed screw 56 the threaded shank 57 of which may be turned into the base 46, as shown at 58. Between the head of the screw and the end portion 58 of the removable section 14 there is confined a gasket 60 to make a liquid tight connection.

While as a preferred form I have shown the bail 44 and band 36 attached to the stationary section and the screw 56 to the removable one, this arrangement may be reversed, due regard being had for the position of the inlet 26 by providing a suitable opening at the center of the base 46. The screw 56 need not be at the center of the end 58 but may obviously be at one side of the center.

The operation of the removal of a filtering unit from my improved container is as follows: The screw 56 is first unscrewed from the base member 46. The upper portion 14 may then be removed by lifting it from the lower portion 16 which will expose bail 44 and filtering unit 34. The bail 44 may then be swung to one side as shown in the dotted outline position in Figure 2. This will free the filtering unit 34 which may now be lifted from the stationary position 16 and a new filtering unit installed. The bail 44 is then swung over the new filtering unit and the spring 50 caused to engage with the end 52 of the new unit. The removable section 14 is then replaced on the stationary section 16 and the screw 56 tightly turned into place.

I claim:

1. In a container comprising two sections, and movable means inclosed within the container and pivotally and swingably attached to one section and adapted to be engaged by a member on the other section for securing said sections together.

2. In a container comprising a plurality of sections, a bail pivoted to one section and extending into a second section, and means on said second section adapted to engage said bail to hold said plurality of sections together.

3. The combination of claim 2, said means comprising a screw passing centrally through the end portion of said second section and engaging in the base of the bail.

4. In a container comprising two end portions, an inlet in one of said end portions, an outlet, a holding member on said end portion, said inlet adapted to support a filter unit and said member adapted to hold said filtering unit, and means on the second end portion engaging said member to hold said end portions and unit in operative relation.

5. The combination of claim 4, said supporting member comprising a swingable bail having a resilient member adapted to engage the filter unit.

6. In an oil filter container comprising a pair of complementary end sections, an inlet at one end of one of said sections adapted to removably receive a filtering unit, a swingable member attached to said section and adapted to swing over and away from said filtering unit to permit its removal, and means on said second section adapted to engage said member to hold said sections and filtering unit in secured relation.

7. In a container comprising two end sections, a purifying unit in said container, a member pivoted to one section and adapted to swing over and hold said unit in said container, and means to hold said end sections together.

8. In a container comprising two end portions, a purifying unit in said container, removable means wholly within said container and attached thereto for rigidly holding said unit in position, and means on said container engaging said first named means to hold said end portions together.

9. In a two part receptacle, a purifying unit seated in one of said parts, means secured to one of said parts and extending freely into the other part to hold said unit in position, and means on said container engaging said first named means to hold said two parts together.

10. In a container comprising two sections, and means, including a bail, inclosed within the container and attached to one section adapted to be engaged by a member on the other section for securing said sections together.

11. In a container comprising two sections, and means comprising a bail pivoted to a band secured to one of the sections and inclosed within the container and adapted to be engaged by a member on the other section for securing said sections together.

12. In a container comprising two sections, and means comprising a bail pivoted to a band secured to the inner side of one of the sections and inclosed within the container and adapted to be engaged by a member on the other section for securing said sections together.

In testimony whereof I affix my signature.

HERBERT G. KAMRATH.